United States Patent [19]
Versini

[11] Patent Number: 5,479,848
[45] Date of Patent: Jan. 2, 1996

[54] DEVICE FOR THE INSTANT, AUTOMATIC, PRESSURIZED PERCOLATION OF FOOD LIQUIDS

[76] Inventor: Rolland Versini, 1 square des Bleuets, Calas 13480, France

[21] Appl. No.: 313,042

[22] PCT Filed: Apr. 5, 1993

[86] PCT No.: PCT/FR93/00340

§ 371 Date: Nov. 17, 1994

§ 102(e) Date: Nov. 17, 1994

[87] PCT Pub. No.: WO93/19655

PCT Pub. Date: Oct. 14, 1993

[30] Foreign Application Priority Data

Apr. 6, 1992 [FR] France ................... 92 04469

[51] Int. Cl.⁶ ............... A47J 31/00; A47J 31/24; A47J 31/34; A47J 31/36
[52] U.S. Cl. ............... 99/287; 99/289 R; 99/295; 99/297; 99/302 P
[58] Field of Search ............... 99/483, 516, 280, 99/287, 289 R, 293, 302 R; 219/274, 284, 288; 100/73, 131, 264, 244; 422/275

[56] References Cited

U.S. PATENT DOCUMENTS

| | | | |
|---|---|---|---|
| 4,796,521 | 1/1989 | Grossi | 99/287 |
| 4,885,986 | 12/1989 | Grossi | 99/289 R |
| 4,934,258 | 6/1990 | Versini | |
| 5,094,156 | 3/1992 | Noreille et al. | 99/516 |
| 5,230,277 | 7/1993 | Bianco | 99/287 |
| 5,275,089 | 1/1994 | Armellin | 99/289 R |
| 5,302,407 | 4/1994 | Vetterli | 426/433 |
| 5,387,256 | 2/1995 | Enomoto | 99/483 |

FOREIGN PATENT DOCUMENTS

| | | |
|---|---|---|
| 745939 | 2/1970 | Belgium . |
| 2657244 | 7/1991 | France . |
| 91/10391 | 1/1991 | WIPO . |

OTHER PUBLICATIONS

FR 86 02636, date unknown.

*Primary Examiner*—Timothy F. Simone

[57] ABSTRACT

Device for instant, automatic, pressurized percolation of food liquids provided with a horizontal mechanical assembly including as main elements functional sections, especially a stationary rail, an infusion chamber with a movable bottom and a movable part carrying the compression piston sliding on the rail, and a filling chamber linked to the movable bottom by a rod whose position and section is adapted to control the movement of a scraper pivoting on a horizontal pivot. The invention is used for preparing espresso coffees.

20 Claims, 3 Drawing Sheets

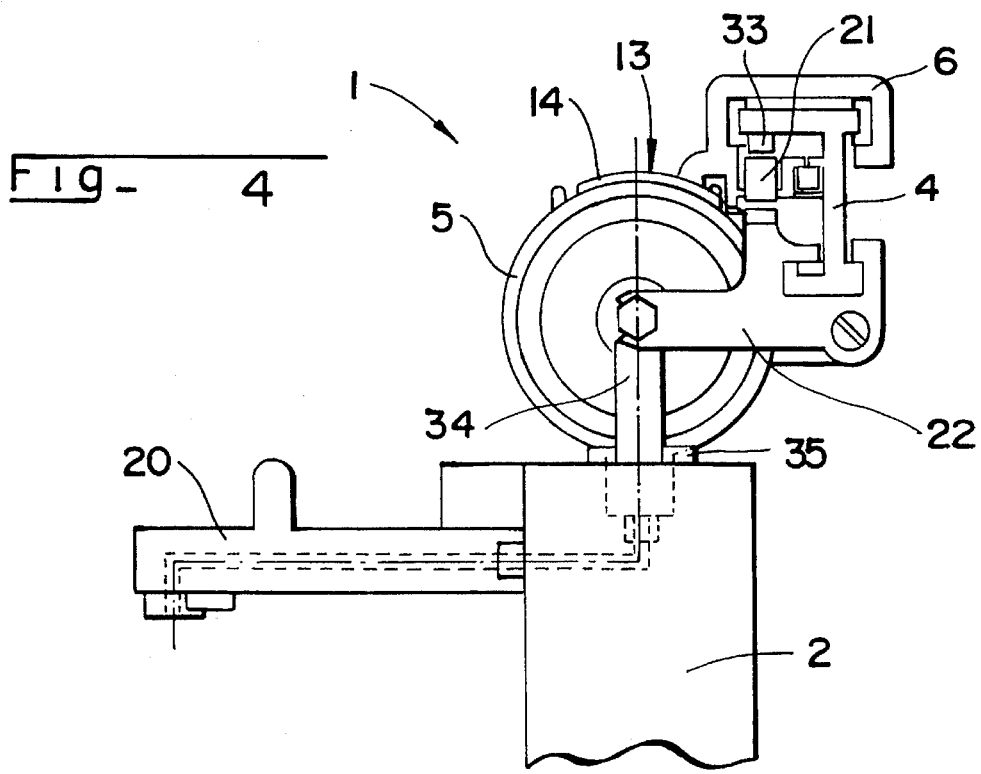
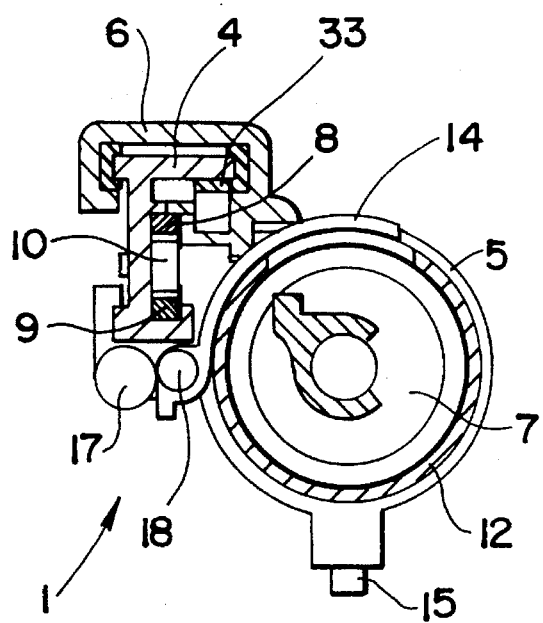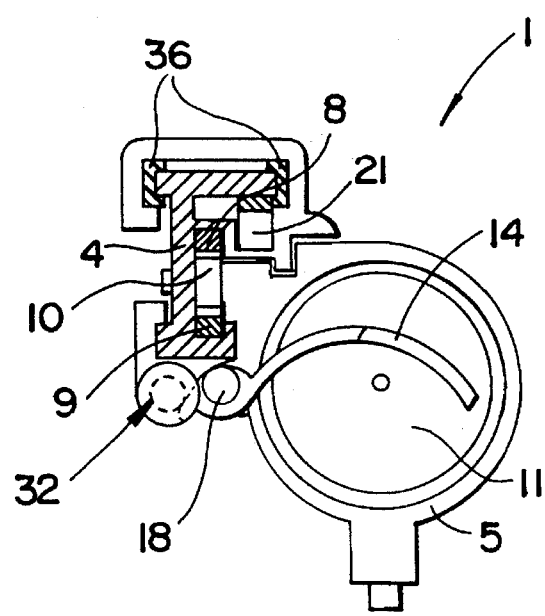

5,479,848

DEVICE FOR THE INSTANT, AUTOMATIC, PRESSURIZED PERCOLATION OF FOOD LIQUIDS

BACKGROUND OF THE INVENTION

1. Field of the Invention

The present invention is related to a device for instant, automatic, pressurized percolation of food liquids, and especially of hot beverages such as coffee.

The invention is intended to enable the preparation, under entirely automated conditions and without human intervention except for sending an initial command signal, of a hot beverage such as an "espresso" type of coffee, i.e., delivered and made available to the consumer immediately upon exiting the percolation phase.

2. Discussion of Background Information

Devices disclosed up until now, and especially the device described in FR 86 02636 by the same inventor, are most often based on the use of a vertical cylinder constituting the infusion chamber into which is poured a certain quantity of ground coffee retained by a mesh constituting the base of the cylinder. A vertically displacing piston compresses the coffee powder, through which hot water is injected and then removed. The hot water generally gets into the cylinder by passing through the mobile compression piston, thereby necessitating flexible tubing which is generally fragile. The base of the cylinder is mobile and can rise within the latter so as to enable the extraction of the powder which is removed by means of a mobile scraper. The assembly is activated by means of generally complex and expensive mechanisms, comprising mechanical or other latching systems, and are controlled by electro-mechanical or electronic devices, attached to a series of micro-contacts, that often break down. The presence of the mobile piston above the cylinder renders the pouring action of the coffee powder therein clumsy, by requiring a complicated progression and mobile guide means. Finally, the hot water supply and removal of the infused coffee is done by a network of conduits that lead to loss of heat.

FR 90 00 820 and PCT/FR91/00030, by the same inventor, partially resolve these faults. They describe a device equipped with a mechanical group arranged horizontally in which the movements of the mobile elements are all caused by two racks with inverted horizontal displacements driving a series of cross-pieces sliding along columns, the infusion chamber with the horizontal axis, through which the hot water passes vertically, being extended by a horizontal, mobile filling chamber directly receiving the poured coffee powder, which is later removed by a scraper, also having a horizontal movement and moved by a rotational lever. A heater located immediately below the mechanical group is directly connected to the infusion chamber by quick connectors for the injection of water and removal of the infused coffee, without tubing, the infused coffee recrossing the body of the heater. The infusion chamber has a mobile base with a magnetic latching driving system. Finally, the mechanical group is driven by virtue of a quick coupling by a motor whose stoppage and reverse motion are directly controlled by an electronic torque sensor that controls the pressure and suppresses the microcontacts.

The machining of this device, however, is relatively complex and expensive, especially insofar as the cross-pieces, columns and scraper are concerned. In addition, magnetic latching is not completely reliable due to the risk of the accumulation of coffee powder on the magnetized elements.

The device as per the present invention, that brings a series of improvements to the devices of FR 90 00 820 and PCT/FR91/00030, overcomes all these disadvantages. In fact, it enables an automatic, pressurized percolation machine to be obtained that comprises a small number of elements that are extremely reliable, especially easy to maintain, having excellent heat yield and a competitive manufacturing price.

SUMMARY OF THE INVENTION

The present invention is constituted by the combination of a removable, horizontal mechanical group, equipped with an infusion chamber having a mobile base, extended by a filling chamber that is displaced in conjunction with the mobile base, a heater located below the mechanical group, equipped with a removable pouring element and connected to the infusion chamber, and a drive unit activating all the mobile members of the mechanical group, the main members thereof being obtained from functional sections, especially a fixed rail, the infusion chamber as well as a mobile element sliding along said fixed rail and bearing the compression piston as well a main rack driving a secondary rack by means of a fixed pinion, the filling chamber and the mobile base also sliding along such fixed rail and being rendered affixed by a rod whose position and section are determined in order to check the movement of scraper pivoting about a horizontal pivot borne by the infusion chamber.

DESCRIPTION OF THE DRAWINGS

In the annexed drawings, provided as non-limiting examples of an embodiment of the aim of the invention:

FIG. 4 is an end view of the mechanical group, along arrow A of FIG. 1, with the removable pouring element in position, FIGS. 5 and 6 are transverse sections of the mechanical group, respectively, along arrows B—B and C—C of FIGS. 2 and 3.

DETAILED DESCRIPTION

Figure 1:
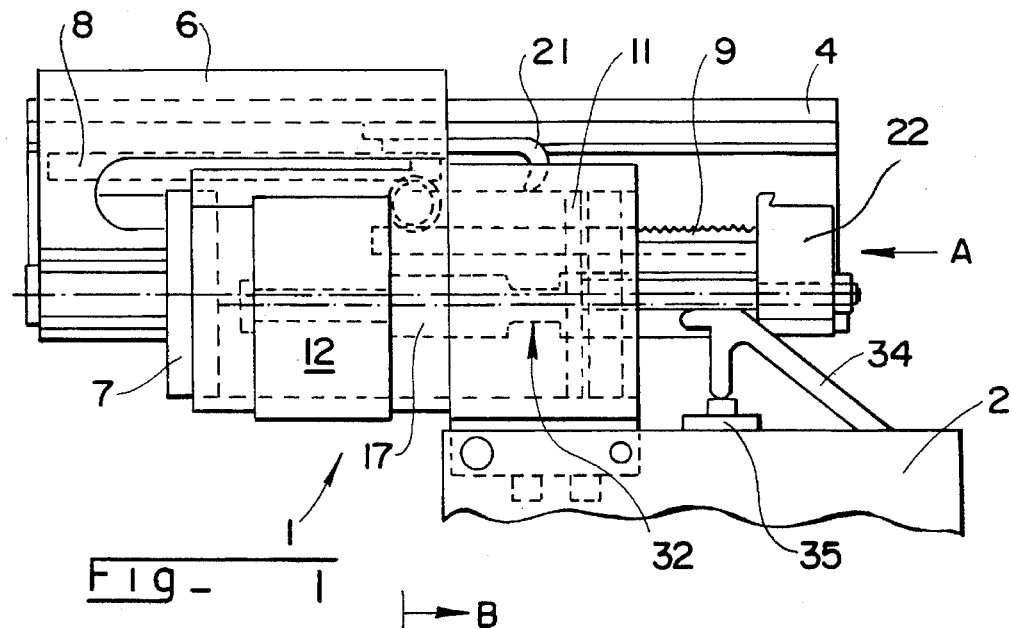
FIGS. 1 through 3 represent, in a front view, the mechanical group at three different stages of the functioning cycle, respectively, in the stand-by position, before the coffee powder has been poured, at the end of the compression period and after ejection of the infused powder by the scraper.

The device, FIGS. 1 through 7, is constituted by a horizontal mechanical group, removable without tools, by a heater 2 for the production of hot water located immediately below mechanical group 1 and connected to infusion chamber 5 by quick connectors 15 for the injection of water and removal of the infused coffee, by a drive unit 3, motorized with automatic reversal of motion, and finally, a removable pouring element 20 mounted on the front of heater 2 and whose placement latches mechanical group 1 on the latter.

Mechanical group 1 comprises a compression piston 7 that is displaced horizontally in a cylindrical infusion chamber 5, having a mobile base 11 in which the passage of hot water occurs via two peripheral meshes transversely with respect to the axis of the compression piston, the infusion chamber being extended by a filling chamber 12, mobile horizontally, in conjunction with mobile base 11, and provided with an upper opening 13 enabling the direct pouring of the coffee powder to be received, such powder being removed by a scraper 14 after percolation.

The passage of hot water can also be done by two series of peripheral perforations, each distributed at 360 degrees in infusion chamber 5 and off-set axially so as to cause the water to move in parallel to the axis of the infusion chamber.

The assembly of the mobile members is activated by drive unit 3, motorized by virtue of a quick coupling causing the displacement of a main rack 8 and of a secondary rack 9 in opposite directions, the latter acting on filling chamber 12 and mobile base 11, so as to successively enable the filling of infusion chamber 5, the compression of the coffee powder therein, and its removal after percolation.

Mechanical group 1 is obtained from functional sections respectively forming a fixed rail 4, the infusion chamber 5 as well as a mobile element 6 sliding along the fixed rail in parallel to the axis of infusion chamber 5. This mobile element bears compression piston 7, main rack 8 and a journaled hook 21 latching onto a snug 23 of a mobile abutment 22 that slides along fixed rail 4, behind the infusion chamber, and on which are mounted the axis of mobile base 11 as well as a rod 17 affixed to filling chamber 12, and whose position and section are determined so as to check the movement of scraper 14, the latter pivoting in a perpendicular plane with respect to the axis of infusion chamber 5 about a horizontal pivot 18 borne by such chamber. Main rack 8, by means of a pinion 10 rotating about an axis affixed to fixed rail 4, activates the secondary rack 9, the latter acting on mobile abutment 22 to bring filling chamber 12 in contact with infusion chamber 5 and to make mobile base 11 enter therein.

The drive unit 3 is constituted of a motor 24 driving, by means of a regulator 25, a screw 26 bearing a threaded catch 27 that engages in a housing 28 provided to this end in the mobile element 6 of mechanical group 1. Screw 26 can be displaced axially in both directions and is normally maintained in the intermediate position by two springs 29 pressing against a bearing mounted in a block 30 affixed to the frame of the drive unit and located at one end of the screw. Such screw bears at its other end the mobile element of a proximity sensor 31. When catch 27 comes to the end of its path, it causes an axial displacement of screw 26 that is detected by the proximity sensor, which engenders an electrical safety information used to command the reversal of motion or stoppage of the motor in case of an anomaly.

The motion control of motor 24, as well as the other functions of the apparatus, heater, pump, coffee grinder, etc., are ensured by an electro-mechanical or electronic programmer associated to a sensor measuring the torque of the motor.

Figure 2:
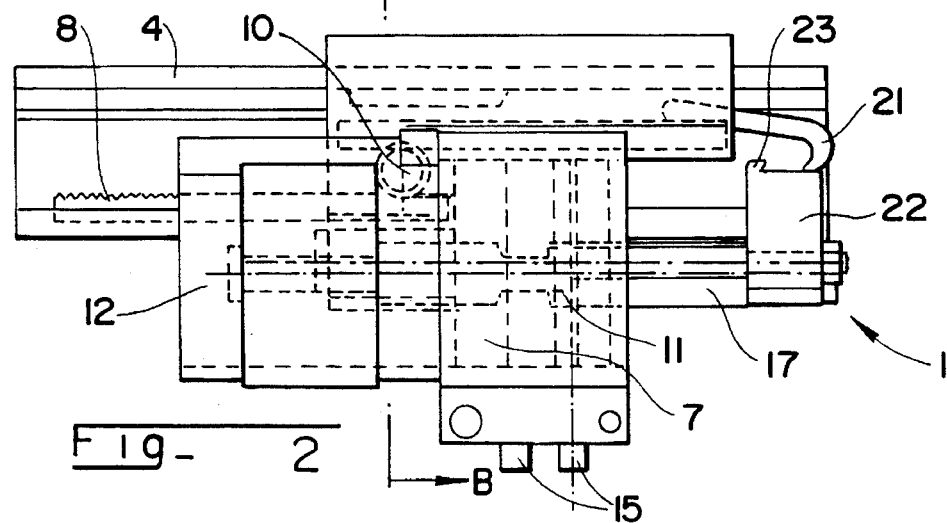

At the start of the cycle (FIG. 1), mobile element 6 of the mechanical group is positioned at the end of fixed rail 4, on the side of filling chamber 12 and the mobile abutment 22 at the other end, the filling chamber is pressed against infusion chamber 5, mobile base 11 is located behind such infusion chamber and scraper 14 is raised. When the functioning command is given, first the coffee powder is poured into the filling chamber via opening 13, then catch 27 drives the mobile element towards the other end of the fixed rail. Compression piston 7 pushes the coffee powder towards the infusion chamber and finally compresses it in the latter (FIG. 2). The resistance encountered by the compression piston thus drives the axial displacement of screw 26 of the drive unit, which causes the stoppage, infusion then reversal of the movement.

Figure 3:
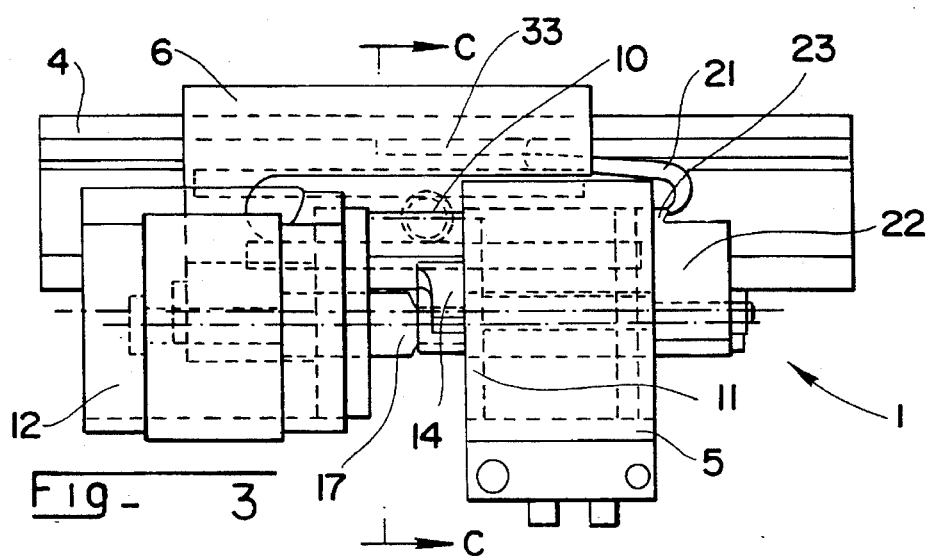
Figure 7:
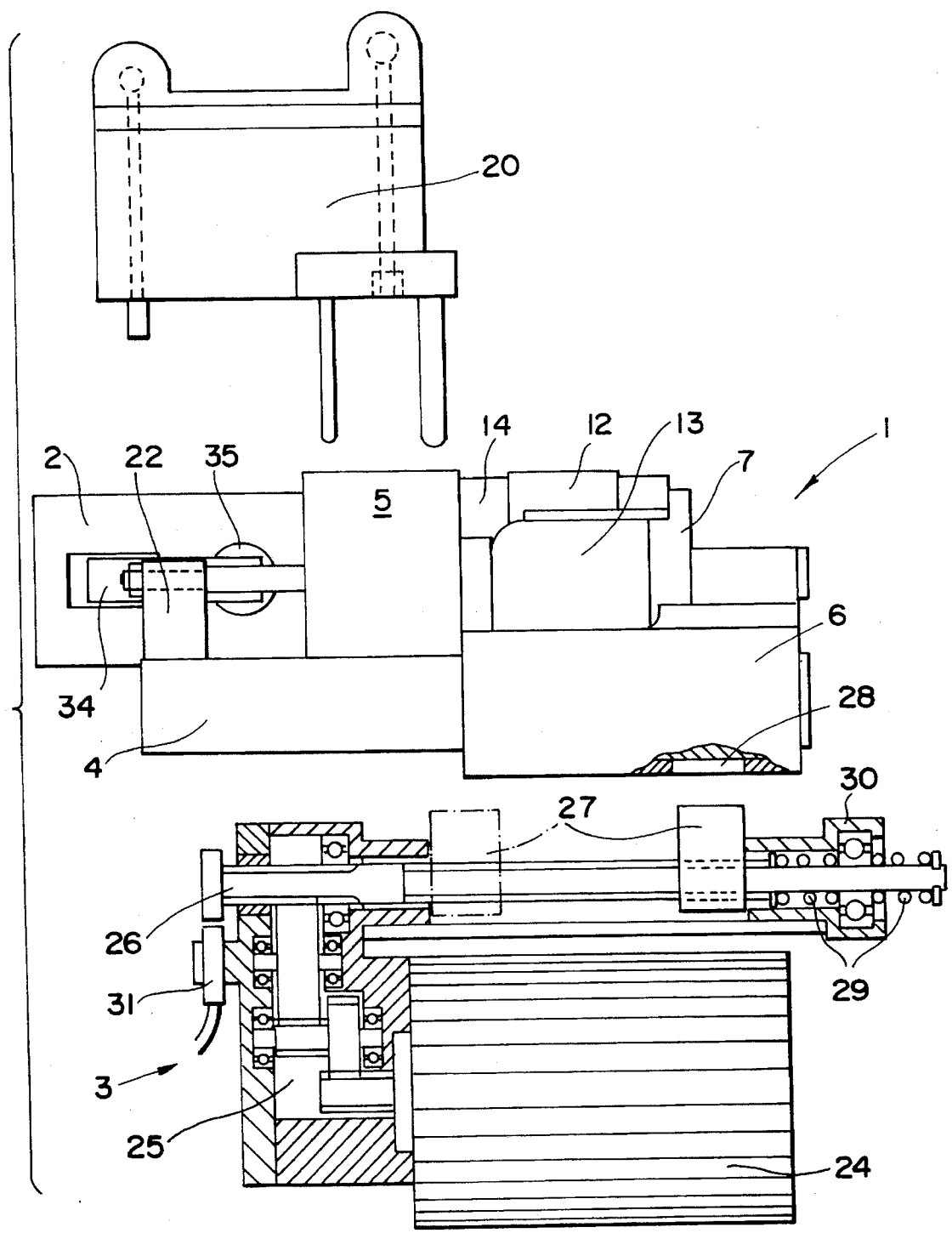
FIG. 7 is a top, splintered view of the device assembly, showing the mechanical group, the heater, the drive unit in a partial horizontal section and the pouring element.

At the moment when mobile element 6 starts in the reverse direction, journaled hook 21 has overtaken snug 23 of mobile abutment 22, which means that it will drive the latter and cause the displacement of mobile element 11 towards the front of infusion chamber 5, the distancing of filling chamber 12 and the displacement of rod 17. Such rod bears a contraction 32 that will enable scraper 14 to get lowered under the action of a spring (not represented) at the moment at which the mobile base reaches the front of the infusion chamber (FIG. 3). At this moment, journaled hook 21 is raised by virtue of a ramp 33 affixed to fixed rail 4 and no longer drives the mobile abutment.

Meanwhile, by its displacement, the latter has lowered a cam 34 mounted on heater 2 and activated a valve 35 to expose the hot water supply circuit to open air, in order to avoid moistening the infused coffee powder, and thus to facilitate its removal.

By continuing its movement, mobile element 6 brings secondary rack 9 into contact with mobile abutment 22 which will be pushed back towards its initial position at the same time as filling chamber 12, mobile base 11 and the repositioning of scraper 14. The cycle then ends, and a new cycle can start.

According to an embodiment variation, heater 2 is placed behind mechanical group 1 and is connected to infusion chamber 5 by a quick connector 15 for the injection of water, the removal of the infused coffee being done directly via a conduit directed towards the front.

Open air exposure will then be done by a longitudinal channel obtained in the driving rod of mobile base 11, extended so as to be able to penetrate into an adequate housing of a fixed abutment (not represented) affixed to fixed rail 4 and located beyond mobile abutment 22. When mobile base 11 is located behind infusion chamber 5, during percolation, the end of the rod is engaged in the fixed abutment and arranged so as to seal it. Conversely, when the mobile base is displaced to cause the expulsion of the infused powder, the end of the rod gets disengaged, enabling the passage of air.

According to a second embodiment variation, drive unit 3 is constituted by a double action jack activated by means of pressurized water that comes from the pump that also provides the water intended to infuse the coffee. In this case, the control of the jack position, as well as of the quantity of water to be infused, can advantageously be done by virtue of a single flow meter associated to a programmable system activating the solenoid valves.

It can also be envisioned that other elements are obtained such as filling chamber 12 or mobile abutment 22 by using the functional sections. On the other hand, if mobile element 6 is manufactured by extrusion, it would be interesting to obtain it from two functional sections assembled after cutting, with a view to reducing material scraps, one of such sections constituting the sliding portion and the other the support of compression piston 7.

The functional sections can be extruded from a light alloy or a reinforced synthetic material, or can be molded if they are to be manufactured in large quantities.

The elements sliding along fixed rail 4, for example filling chamber 12 and mobile element 22 will be advantageously obtained from a material having a low friction coefficient, such as polyamide, especially when said rail is metallic. If the rail and mobile element 6 are both made of a light alloy, slides 36 made of polyamide or similar, will be interposed between them.

The design of the system described hereinabove enables the manufacture of a machine that is very compact and capable of being obtained in large quantities, at reasonable prices, which means that both domestic and professional use can be envisaged for it.

The positioning of the various component elements provide the object of the invention with a maximum of useful effects that had not been, up until now, obtained by similar devices.

I claim:

1. Device for instant, automatic, pressurized percolation of food liquids including hot beverages, comprising:

a mechanical group formed from functional sections, said mechanical group being removable without tools, and comprising:

an infusion chamber comprising an upper opening enabling receipt of a food powder and a longitudinal axis;

a compression piston horizontally displaceable in said infusion chamber, said piston including a mobile base;

a filling chamber extending said infusion chamber, said filling chamber being horizontally movable with said mobile base;

a horizontal pivot borne by said infusion chamber;

a scraper for removing food powder, said scraper being pivotal in a vertical plane perpendicular to said longitudinal axis of said infusion chamber around said horizontal pivot;

a main rack, a secondary rack and a pinion gear;

a mobile element bearing said compression piston and driving said main rack which is affixed to said mobile element;

at least one fixed rail, said infusion chamber, said mobile element, said filling chamber and said mobile base being slidable along said at least one fixed rail, and said pinion being affixed to said at least one fixed rail so that said main rack activates said secondary rack in an opposite direction to movement of said main rack through said pinion;

a rod affixing said filling chamber and said mobile base, said rod being constructed and arranged so as to check movement of said scraper;

a heater for production of hot water capable of being attached to said mechanical group through said infusion chamber by quick connectors; and a drive unit for activating movable elements and through reversal of motion causing displacement of said main rack and said secondary rack in opposite directions.

2. The device according to claim 1, further comprising a mobile abutment including a snug positioned behind said infusion chamber and a journaled hook borne on said mobile element, said mobile base includes a driving rod, and said driving rod and said rod are affixed to said mobile abutment, said mobile abutment being slidable along said fixed rail via action of said secondary rack and said journaled hook latching onto said snug.

3. The device according to claim 1, wherein said mechanical group is composed of extruded light alloy or reinforced synthetic material.

4. The device according to claim 1, wherein said mechanical group is composed of molded light alloy or reinforced synthetic material.

5. The device according to claim 1, wherein said heater is positioned immediately below said mechanical group and is connected to said infusion chamber by a quick connector for injection of water and removal of infused hot beverage; and a removable pouring element is mounted at a front portion of said heater and is constructed and arranged to latch said mechanical group thereto.

6. The device according to claim 2, wherein said heater is positioned immediately below said mechanical group and is connected to said infusion chamber by a quick connector for injection of water and removal of infused hot beverage; and a removable pouring element is mounted at a front portion of said heater and is constructed and arranged to latch said mechanical group thereto.

7. The device according to claim 1, wherein said heater is positioned behind said mechanical group and is connected to said infusion chamber by a quick connector for injection of water and removal of infused hot beverage directly via a conduit directed towards a front portion of said mechanical group.

8. The device according to claim 7, comprising a driving rod for said mobile base, said driving rod including a longitudinal channel providing open air exposure and an end; a second abutment affixed to said fixed rail, said second abutment comprising a recess; said driving rod extending so as to be capable of penetrating into said recess of said fixed abutment and arranged so that said end of said driving rod is adapted to be sealed by engaging said recess during percolation, and adapted to be disengaged while allowing air to pass when said mobile base is displaced in order to cause expulsion of infused powder.

9. The device according to claim 2, wherein said heater is positioned behind said mechanical group and is connected to said infusion chamber by a quick connector for injection of water and removal of infused hot beverage directly via a conduit directed towards a front portion of said mechanical group.

10. The device according to claim 9, wherein said driving rod includes a longitudinal channel providing open air exposure and an end; a second abutment is affixed to said fixed rail, said second abutment comprising a recess; and said driving rod extends so as to be capable of penetrating into said recess of said fixed abutment and arranged so that said end of said driving rod is adapted to be sealed by engaging said recess during percolation, and adapted to be disengaged while allowing air to pass when said mobile base is displaced in order to cause expulsion of infused powder.

11. The device according to claim 1, wherein said drive unit comprises:

a frame;

a threaded catch;

a screw bearing said catch, said screw capable of being axially displaced in opposite directions to drive said catch along a path, said screw including a first end and a second end;

a regulator;

a motor for driving said screw through said regulator;

said mobile element including a housing and said threaded catch being engaged in said housing;

a bearing mounted on a block affixed to said frame of said drive unit and positioned at said first end of said screw;

two springs pressing against said bearing for maintaining said screw in a normal intermediate position; and a proximity sensor mounted on said second end of said screw to control reversal of motion or stoppage of said drive motor in case of an anomaly, when said threaded catch, at an end of the path, causes axial displacement of said screw.

12. The device according to claim 2, wherein said drive unit comprises:

a frame;

a threaded catch;

a screw bearing said catch, said screw capable of being axially displaced in opposite directions to drive said catch along a path, said screw including a first end and a second end;

a regulator;

a motor for driving said screw through said regulator;

said mobile element including a housing and said threaded catch being engaged in said housing;

a bearing mounted on a block affixed to said frame of said drive unit and positioned at said first end of said screw;

two springs pressing against said bearing for maintaining said screw in a normal intermediate position; and a proximity sensor mounted on said second end of said screw to control reversal of motion or stoppage of said drive motor in case of an anomaly, when said threaded catch, at an end of the path, causes axial displacement of said screw.

13. The device according to claim 12, including a contraction in said driving rod capable of interacting with said scraper to lower said scraper under action of a spring; and a ramp on said fixed rail for raising said journaled hook; and said mechanical group is constructed and arranged to comprise a sequence of operation including displacement of said threaded catch driving said mobile element so that said compression piston pushes the food powder, previously poured into said filling chamber, into said infusion chamber and compresses the food powder in said infusion chamber, with resistance encountered by said compression piston then causing stoppage of said drive motor; infusion of the food powder; reversal of motion and displacement by virtue of said journaled hook, said mobile abutment, said driving rod and said mobile base towards a front portion of said infusion chamber, and distancing of said filling chamber; lowering of said scraper with said contraction when said mobile base reaches the front portion of said infusion chamber; raising of said journaled hook by said ramp so as to no longer drive said mobile abutment; and pushing of said mobile abutment back towards an initial position simultaneously with said filling chamber, said mobile base and said scraper with said mobile element by bringing said secondary rack in contact with said mobile abutment.

14. The device according to claim 13, including a hot liquid supply circuit; a valve capable of exposing said hot liquid supply circuit to open air to avoid moistening of the food powder to facilitate removal of the food powder; and a cam positioned on said heater and capable of being lowered by said mobile abutment at an initial point of displacement.

15. The device according to claim 1, wherein said drive unit comprises a double action jack; and further comprising a pump including solenoid valves for providing liquid for infusing said food powder and for activating said double action jack, and a single flow meter associated with a programmable system for activating said solenoid valves.

16. The device according to claim 2, wherein said drive unit comprises a double action jack; and further comprising a pump including solenoid valves for providing liquid for infusing said food powder and for activating said double action jack, and a single flow meter associated with a programmable system for activating said solenoid valves.

17. The device according to claim 1, including two series of peripheral perforations, each of said two series being distributed along 360 degrees in said infusion chamber, and axially off-set so as to cause liquid to progress in parallel to said longitudinal axis of said infusion chamber.

18. The device according to claim 2, including two series of peripheral perforations, each of said two series being distributed along 360 degrees in said infusion chamber, and axially off-set so as to cause liquid to progress in parallel to said longitudinal axis of said infusion chamber.

19. Device for instant, automatic, pressurized percolation of hot coffee, comprising:

a mechanical group formed from functional sections, said mechanical group being removable without tools, and comprising:

an infusion chamber comprising an upper opening enabling receipt of ground coffee and a longitudinal axis;

a compression piston horizontally displaceable in said infusion chamber, said piston including a mobile base;

a filling chamber extending said infusion chamber, said filling chamber being horizontally movable with said mobile base;

a horizontal pivot borne by said infusion chamber;

a scraper for removing ground coffee, said scraper being pivotal in a vertical plane perpendicular to said longitudinal axis of said infusion chamber around said horizontal pivot;

a main rack, a secondary rack and a pinion gear;

a mobile element bearing said compression piston and driving said main rack which is affixed to said mobile element;

at least one fixed rail, said infusion chamber, said mobile element, said filling chamber and said mobile base being slidable along said at least one fixed rail, and said pinion being affixed to said at least one fixed rail so that said main rack activates said secondary rack in an opposite direction to movement of said main rack through said pinion;

a mobile abutment including a snug positioned behind said infusion chamber and a journaled hook borne on said mobile element;

said mobile base including a driving rod, and said driving rod and said rod are affixed to said mobile abutment, said mobile abutment being slidable along said fixed rail via action of said secondary rack and said journaled hook latching onto said snug; and a rod affixing said filling chamber and said mobile base, said rod being constructed and arranged so as to check movement of said scraper;

a heater for production of hot water capable of being attached to said mechanical group; and a drive unit for activating movable elements and through reversal of motion causing displacement of said main rack and said secondary rack in opposite directions.

20. The device according to claim 19, wherein said drive unit comprises:

a frame;

a threaded catch;

a screw bearing said catch, said screw capable of being axially displaced in opposite directions to drive said catch along a path, said screw including a first end and a second end;

a regulator;

a motor for driving said screw through said regulator;

said mobile element including a housing and said threaded catch being engaged in said housing;

a bearing mounted on a block affixed to said frame of said drive unit and positioned at said first end of said screw;

two springs pressing against said bearing for maintaining said screw in a normal intermediate position; and a proximity sensor mounted on said second end of said screw to control reversal of motion or stoppage of said drive motor in case of an anomaly, when said threaded catch, at an end of the path, causes axial displacement of said screw.

* * * * *